Patented July 7, 1925.

1,545,032

UNITED STATES PATENT OFFICE.

RUSSELL BORN, OF EDGEWOOD, PENNSYLVANIA.

PROCESS OF RECOVERING SILVER.

No Drawing. Application filed February 21, 1924. Serial No. 694,441.

*To all whom it may concern:*

Be it known that I, RUSSELL BORN, a citizen of the United States, and a resident of Edgewood, in the county of Allegheny and State of Pennsylvania, have invented a new and useful Improvement in Processes of Recovering Silver, of which the following is a specification.

This invention relates to a process for recovering silver, and particularly the recovery thereof from spent fixing solutions in photographic work.

It is well known that in photographic work, thin films, sheets of glass, paper, celluloid, or other suitable materials, have applied to them certain compounds of silver for the purpose of rendering them sensitive to light. After exposure to light, these films or sheets are treated in turn with a "developer" to establish the image, and afterwards with a "fixing bath" to dissolve and remove the portions of the silver salts which are still unchanged. The most commonly employed fixing solution is that of sodium thiosulphate, sometimes called sodium hyposulphite, known to the trade as "hypo". "Hypo" is now almost universally used for this purpose.

After the "hypo" solution has been used sufficiently to exhaust its practical effectiveness for the photographer's purpose, then known as "spent hypo solution," it is obvious that although of no further use to the photographer, it contains more or less silver in solution as thiosulphate of silver or perhaps double thiosulphate of silver and sodium. This silver salt in solution is subsequently referred to throughout the specification and claims as "silver thiosulphate". The amount of silver in solution varies but will generally be between one-fourth ounce and one ounce in a gallon of spent "hypo" solution. It is desirable to recover this silver, provided it can be done profitably and without objectionable incidental results.

Heretofore, although many methods have been attempted, difficulties and objections have been experienced with those which will separate substantially all of the silver from the solutions, and others recover only part of the silver present. Substantially complete separation has been obtained by the employment of sulphide of sodium or of potassium, or sometimes of calcium to precipitate insoluble silver sulphide. This method has objectionable features due to the extreme fineness of the precipitate obtained and the slowness with which it settles out, and the difficulty of filtering due to the clogging of the filters employed; and to the incidental formation and escape of hydrogen sulphide gas with its disagreeable and objectionable odor. This method is actually prohibited in certain localities because of this odorous gas which is not only disagreeable but somewhat poisonous. This method is also objectionable due to the fineness of the precipitate which settles very slowly and easily clogs the filters, as previously explained.

The present invention not only enables substantially the entire quantities of silver, even in very weak solutions, to be recovered, but is effected without the formation of the disagreeable odors, and the precipitate is not only thrown down quickly, but is in a condition whereby it can be much more readily separated by passing through filters without danger of unduly clogging the same.

The invention consists in obtaining a precipitate of silver sulphide with any effective soluble sulphide, such as sodium or potassium sulphide, but always in the presence of an excess of an alkali, sodium or potassium hydroxide being preferred. The precipitated silver sulphide may then be treated in any of the well known ways to obtain the silver in metallic form.

Preferably, in actual practice, a "treating solution" is first made containing the soluble sulphide, say sodium sulphide, and the alkali, say sodium hydroxide, and this solution is then poured into the "spent hypo solution". The character of the spent solution varies within rather wide limits, and the quantities of the ingredients in the "treating solution" will vary correspondingly. This will be obvious to those skilled in this particular art, it being absolutely necessary, however, that the alkali be present in such proportion as to always maintain an excess thereof. Under some conditions, it may be found desirable to add the sodium sulphide and the alkali to the spent "hypo" solution without preliminarily mixing them to form the "treating solution," as described, in which event the alkali is first added followed by the addition of the sodium sulphide.

Under these alkaline conditions, the addition of the precipitant seems to produce a more granular precipitate and it is presumed that this functions to gather the ordinarily extremely fine particles of silver sulphide into much larger ones, thereby not only greatly increasing the speed of precipitation but rendering the precipitate in such condition that it can be readily separated by passing through suitable filters without danger of clogging. As stated, it is merely presumed that this is the explanation of the new results produced, but regardless of the actual cause and the reactions which take place, the silver sulphide is thrown down rapidly in a suitable condition to be separated by filtering, and the entire reactions take place without the formation of disagreeable or noxious odors of any kind. It is also noted that the ease and the completeness with which the separation of the silver content of the spent solution occurs particularly adapt the process to the treatment of very weak solutions which with many of the known processes would prove unprofitable from the commercial view point.

It is thus seen that the invention provides a process which is simple, effective, convenient, and economical to practice, and one which can be used profitably for the treatment of very weak spent solutions, and in places where noxious or disagreeable odors would be objectionable.

While the invention has been described more particularly for use in connection with the recovery of the metal from spent photographic "hypo" solutions, it is obvious that the same may be employed to recover the metal from other than photographic solutions, and it is therefore not intended to limit the invention beyond that pointed out and defined in the appended claims.

I claim:

1. A process of recovering silver from solutions containing silver thiosulphate, which comprises the treatment of the said solution with a soluble sulphide, constantly maintaining the solution alkaline.

2. The process of recovering silver from solutions containing hyposulphite of silver which comprises the treatment of said solution with a soluble sulphide in the presence of an excess of an alkali.

3. The process of recovering silver from spent "hypo" solution which comprises the addition to the said solution of a treating solution containing a soluble sulphide and an excess of an alkali.

4. The process of recovering silver from spent photographic solution containing silver thiosulphate which comprises treating the said solution with sodium sulphide in the presence of an excess of an alkali.

5. The process of recovering silver from spent photographic solution containing silver thiosulphate which comprises treating the said solution with a mixture of sodium sulphide and sodium hydroxide, the proportion of the hydroxide being sufficient to always maintain a slight excess thereof.

In testimony whereof, I sign my name.

RUSSELL BORN.

Witness:
EDWIN O. JOHNS.